UNITED STATES PATENT OFFICE.

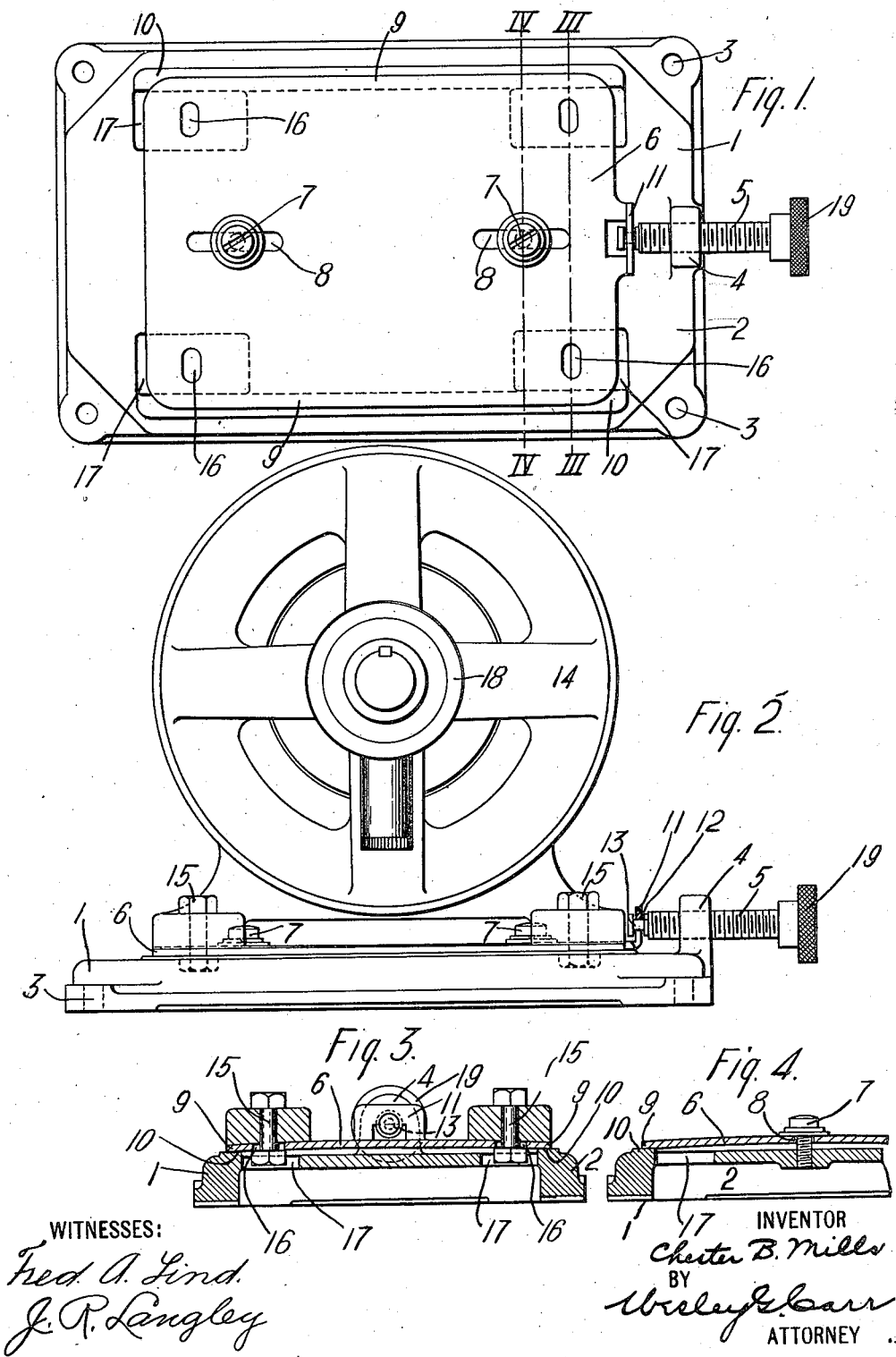

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

BED-PLATE.

1,227,292.

Specification of Letters Patent.    Patented May 22, 1917.

Application filed August 2, 1913. Serial No. 782,748.

*To all whom it may concern:*

Be it known that I, CHESTER B. MILLS, a citizen of the United States, and a resident of East McKeesport, in the county of Allegheny and State of Pennsylvania, have invented a new and useful Improvement in Bed-Plates, of which the following is a specification.

My invention relates to bed plates such as are employed in connection with electric motors or other power devices, and it has for its object to provide a means for mounting motors which is simple and inexpensive in construction and convenient in operation to adjust and maintain the position of the motors.

In the adjustment of the positions of motors by means of bed plates having movable portions to which the motors are attached, it has usually been necessary to loosen binding screws or similar devices before adjustment and to tighten the same after adjustment.

I have provided a structure by means of which the position of a motor may be adjusted without either preliminary or subsequent operations. The movable portion of the bed plate comprises a resilient plate member, the tension of which may be adjusted as desired and which will be retained in any position in which it may be placed.

The details of my invention will be described in connection with the accompanying drawings in which Figure 1 is a plan view of a bed plate constructed in accordance with my invention. Fig. 2 is a side view, partially in section and partially in elevation, of the bed plate with a motor attached thereto. Figs. 3 and 4 are sectional views taken on lines III—III and IV—IV, respectively, of Fig. 1.

The bed plate 1 comprises a stationary base member 2 of cast or pressed material which is provided with holes 3 for fastening bolts and with a threaded lug 4 to receive an adjusting screw 5. A resilient plate member 6 is slidably mounted upon the member 2 and is attached to the latter by means of bolts 7 which pass through slots 8 in the plate 6. The plate 6 is curved with its convex surface outward and its side portions 9 engage bearing surfaces 10 on the base member 2. The plate 6 is provided at one end with a bent portion 11 having an opening 12 to receive a reduced portion 13 of the adjusting screw 5. A motor 14 is illustrated as attached to the plate member 6 by bolts 15 which project through slots 16 in the plate 6 and into slots 17 in the member 2. The motor 14 is illustrated as an electric motor of small power and is provided with a drive pulley 18 for belt connection to suitable driven mechanism.

The bolts 7 may be adjusted to place the plate member 6 under a suitable degree of tension before the motor is put in place. When it is desired to shift the position of the motor to vary the tension of the driving belt, or for any other purpose, it is only necessary to turn the adjusting screw 5 by means of the knurled head 19. The tension of the plate member 6 is uniform throughout the extent of the movement thereby insuring a uniform degree of friction between the plate member 6 and the member 2 at their respective engaging surfaces. The path of movement of the plate member 6 is controlled by the bolts 7 and the slots 8. The alinement of the bolts 7, slots 8 and the adjusting screw 5 provides a simple means for preventing the binding of the various parts during the operations of adjustment. The plate member 6 and the motor 14 will be retained in their various adjusted positions by the adjusting screw 5. The tension of the plate member 6 prevents any vibration of the motor relatively to the base 2.

I claim as my invention:

1. The combination with a stationary member, of a relatively movable resilient member mounted thereon and in adjustable frictional engagement therewith, and means for adjusting the relative positions of said members.

2. The combination with a stationary member, of an inherently resilient plate member in frictional engagement therewith, and means coacting with said stationary member for shifting the plate member.

3. The combination with a stationary member, of a resilient plate member in frictional engagement therewith, and means coacting with said stationary member for adjusting the tension of said plate member, whereby the degree of said frictional engagement may be varied.

4. The combination with a stationary member, of a resilient plate member slidably mounted thereon, means for adjusting the tension of said plate member, and means for shifting said plate member.

5. The combination with a stationary base member, of a resilient plate member slidably mounted thereon, means for adjusting the tension of said plate member, means for shifting said plate member, and means alined with said shifting means for guiding the movements of said plate member.

6. The combination with a stationary base member, of a resilient member slidably mounted thereon, means for adjusting the tension of said slidable member, and means for adjusting the position of said slidable member.

7. The combination with a stationary member, of a resilient plate member slidably mounted thereon, means for shifting said plate member, and means alined with said shifting means for guiding the movements of said plate member.

8. The combination with a stationary member, of a relatively movable member having portions thereof in adjustable frictional engagement with the said stationary member and means for adjusting the relative positions of said members.

9. The combination with a stationary member, of a relatively movable member having portions thereof in frictional engagement with the said stationary member and means coacting with said stationary member for varying the degree of said frictional engagement.

10. The combination with a stationary member, of a curved resilient plate having parallel edges thereof in frictional engagement with the said stationary member and means coacting with said stationary member for varying the degree of said frictional engagement.

In testimony whereof I have hereunto subscribed my name this 25th day of July, 1913.

CHESTER B. MILLS.

Witnesses:
J. P. MISONOW,
B. B. HINES.